United States Patent
Biehl

(10) Patent No.: US 10,883,623 B2
(45) Date of Patent: Jan. 5, 2021

(54) SOLENOID ACTUATOR

(71) Applicant: Andrew Paul Biehl, Oconomowoc, WI (US)

(72) Inventor: Andrew Paul Biehl, Oconomowoc, WI (US)

(73) Assignee: TLX Technologies, LLC, Pewaukee, WI (US)

( * ) Notice: Subject to any disclaimer, the term of this patent is extended or adjusted under 35 U.S.C. 154(b) by 53 days.

(21) Appl. No.: 16/216,715

(22) Filed: Dec. 11, 2018

(65) Prior Publication Data

US 2020/0182372 A1 Jun. 11, 2020

(51) Int. Cl.
*F16K 31/53* (2006.01)
*F16K 31/524* (2006.01)

(52) U.S. Cl.
CPC ............ *F16K 31/53* (2013.01); *F16K 31/524* (2013.01)

(58) Field of Classification Search
CPC ........ F16K 31/10; F16K 31/53; F16K 31/524; F16K 31/52408; F16K 31/05; F16K 31/56
See application file for complete search history.

(56) References Cited

U.S. PATENT DOCUMENTS

| | | | | |
|---|---|---|---|---|
| 1,050,431 A | * | 1/1913 | Darrin | F16K 31/10 251/129.2 |
| 1,395,203 A | * | 10/1921 | Olsen | F16K 31/10 137/552 |
| 1,555,851 A | * | 10/1925 | Van Emon | F16K 31/10 251/48 |
| 2,539,913 A | * | 1/1951 | Koepcke | F16K 31/10 74/110 |
| 2,780,433 A | * | 2/1957 | Fleming | F16K 31/10 251/70 |
| 2,846,180 A | * | 8/1958 | Kongelbeck | F16K 31/10 251/68 |
| 3,667,722 A | * | 6/1972 | Katz | F16K 31/10 251/30.04 |
| 9,062,788 B2 | | 6/2015 | Mainland et al. | |
| 9,103,461 B2 | | 8/2015 | Dahlgren | |
| 9,714,718 B2 | | 7/2017 | Rogala et al. | |

\* cited by examiner

*Primary Examiner* — Eric Keasel
(74) *Attorney, Agent, or Firm* — Reinhart Boerner Van Deuren P.C.

(57) ABSTRACT

A solenoid actuator includes a housing, a solenoid coil carried within the housing. An armature is carried within the housing and acted upon by the solenoid coil. A torque transfer arrangement of the solenoid actuator is configured to produce a rotational torque output upon an actuation of the armature. A firing pin is in contact with the torque transfer arrangement such that the rotational torque output produced by the torque transfer arrangement linearly transitions the firing pin from an unfired position to a fired position.

18 Claims, 4 Drawing Sheets

US 10,883,623 B2

SOLENOID ACTUATOR

FIELD OF THE INVENTION

This invention generally relates to actuator, and more particularly solenoid actuators.

BACKGROUND OF THE INVENTION

Solenoid actuators are readily considered as a viable means of linear actuation. Such actuators can provide a high force output in a short stroke length. Such devices are used in a variety of applications. For example, such actuators may be used in a fire suppression systems. In a typical configuration, a suppressant is contained in a pressurized tank. A valve is connected to this tank. When the valve is opened, the suppressant flows from the tank and to its desired location via a sprinkler system or the like.

The aforementioned valve is actuated by a solenoid actuator. The solenoid actuator typically includes a solenoid coil that acts upon an armature. The armature in turn acts upon a mechanism that is ultimately linked to a firing pin. Manipulation of the mechanism by the armature causes a movement in the firing pin by releasing stored mechanical energy of the mechanism. The firing pin is used to actuate the valve of the fire suppressant system, and as such, must provide a sufficient amount of force. The solenoid actuator must reliably fire when commanded to do so in order to open the valve to allow the suppressant to leave the tank. While such solenoid actuators have proven particularly useful in this one exemplary application, they are now without their own drawbacks.

Indeed, such solenoid actuators, particularly those in fire suppression applications for example, typically employ a relatively complex fulcrum mechanism to cause a movement in their associated firing pin. This fulcrum mechanism is prone to wear and does not allow for a broad force multiplication of its stored force to its output force.

As a result, it is not uncommon for manufacturers to offer a variety of different solenoid actuators of essentially the same design, but having differing force outputs. A user must select the particular actuator they need based on the force required to actuate the valves of their system. Some valves may require considerably higher forces than others, leading to a large stratification of solenoid actuators having differing force outputs.

Accordingly, there is a need in the art for a solenoid actuator having a reliable actuation mechanism which provides a broad range of force outputs in a desirable stroke, which is also not prone to wear issues. The invention provides such a solenoid actuator. These and other advantages of the invention, as well as additional inventive features, will be apparent from the description of the invention provided herein.

BRIEF SUMMARY OF THE INVENTION

In one aspect, solenoid actuator for connection to a device. An embodiment of such a solenoid actuator includes a housing with a solenoid coil carried within the housing. This embodiment also includes an armature acted upon by the solenoid coil that is linearly movable within the housing. The armature has a locked position and an unlocked position. This embodiment also includes a torque transfer arrangement having a loaded position and an unloaded position. The armature in the locked position holds the torque transfer arrangement in the loaded position. The armature in the unlocked position permits the torque transfer arrangement to transition from the loaded position to the unloaded position. This embodiment also includes a firing pin that is linearly movable between an unfired position and a fired position.

In the unfired position, the firing pin has a first extension distance measured between a terminal end of the firing pin and a reference axis of the torque transfer arrangement. In the fired position, the firing pin has a second extension distance measured between the terminal end of the firing pin and the reference axis of the torque transfer arrangement. The second extension distance is greater than the first extension distance.

In embodiments according to this aspect, the torque transfer arrangement includes a first gear element, a second gear element, and at least one torsion spring acting on one of said first or second gear elements. The first and second gear elements each include gear teeth that are in meshed contact with one another such that a torque input provided by the torsion spring to one of the first or second gear elements produces a torque output at the one of the first or second gear elements.

In embodiments according to this aspect, each of the first and second gear elements includes a planar seat and a curved cam surface. A first end of the armature is in contact the seat of the first gear element when the armature is in the locked position, and the first end of the armature is in contact with the cam surface of the first gear element when the armature is in the unlocked position.

A first end of the firing pin is in contact with the seat of the second gear element when the firing pin is in the unfired position, and the first end of the firing pin is in contact with the cam surface of the second gear element when the firing pin is in the fired position.

In embodiments according to this aspect, the torsion spring provides the torque input to the first gear element such that the first gear element drives the second gear element. A gear ratio between the first gear element and the second gear element is 2.5:1.

In embodiments according to this aspect, the solenoid actuator also includes a manual release mechanism operably connected to the armature such that a user manipulated control of the manual release mechanism on an exterior of the housing is operable to transition the armature from the locked to the unlocked position upon actuation of the user manipulated control.

In embodiments according to this aspect, the solenoid actuator also includes a slide bushing situated in an opening of the solenoid coil. The slide bushing has a central bore. The armature is movable through the central bore of the slide bushing.

In another aspect, the invention provides a solenoid actuator for connection to a device. An embodiment of a solenoid actuator according to this aspect includes a housing, a solenoid coil carried within the housing, and an armature within the housing that is acted upon by the solenoid coil. This embodiment also includes a torque transfer arrangement configured to produce a rotational torque output upon an actuation of the armature, as well as a firing pin in contact with the torque transfer arrangement such that the rotational torque output produced by the torque transfer arrangement linearly transitions the firing pin from an unfired position to a fired position.

In embodiments according to this aspect, in the unfired position, the firing pin has a first extension distance measured between a terminal end of the firing pin and a reference axis of the torque transfer arrangement. In the fired position, the firing pin has a second extension distance measured between the terminal end of the firing pin and the reference axis of the torque transfer arrangement. The second extension distance is greater than the first extension distance.

In embodiments according to this aspect, the torque transfer arrangement includes a first gear element, a second gear element, and at least one torsion spring acting on one of said first or second gear elements. The first and second gear elements each include gear teeth that are in meshed contact with one another such that a torque input provided by the torsion spring to one of the first or second gear elements produces a torque output at the one of the first or second gear elements.

In embodiments according to this aspect, the solenoid actuator also includes a manual release mechanism operably connected to the armature such that a user manipulated control of the manual release mechanism on an exterior of the housing is operable to transition the armature from the locked to the unlocked position upon actuation of the user manipulated control.

In embodiments according to this aspect, the solenoid actuator also includes a slide bushing situated in an opening of the solenoid coil. The slide bushing has a central bore. The armature is movable through the central bore of the slide bushing.

In yet another aspect, the invention provides a solenoid actuator for connection to a device. An embodiment of such a solenoid actuator includes a housing, a solenoid coil carried within the housing, and an armature within the housing that is acted upon by the solenoid coil. The armature has a locked position and an unlocked position. This embodiment also includes a torque transfer arrangement comprising a first gear element, a second gear element, and at least one torsion spring acting on one of said first or second gear elements. The first and second gear elements each having gear teeth in meshed contact. This embodiment also includes a firing pin linearly movable within the housing. The firing pin has an unfired position and a fired position. In the unfired position, a first end of the firing pin is seated against a seat of the second gear element and the armature is in the locked position such that a first end of the armature is seated against a seat of the first gear element. In the fired position, the first end of the firing pin is in contact with a cam surface of the second gear element and the armature is in the unlocked position such that the first end of the armature is in contact with a cam surface of the first gear element.

In embodiments according to this aspect, a rotational torque output produced by the torque transfer arrangement linearly transitions the firing pin from an unfired position to a fired position. The first and second gear elements each include gear teeth that are in meshed contact with one another such that a torque input provided by the torsion spring to one of the first or second gear elements produces a torque output at the one of the first or second gear elements. The torsion spring provides the torque input to the first gear element such that the first gear element drives the second gear element.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, FIGS. 1-4 illustrate an embodiment of a solenoid actuator 20 constructed in accordance with the teachings herein. As will explained below, solenoid actuator 20 provides distinct advantages over prior designs by utilizing an improved torque transfer arrangement which is relatively less prone to wear, and has a relatively broad force output range.

Figure 1:
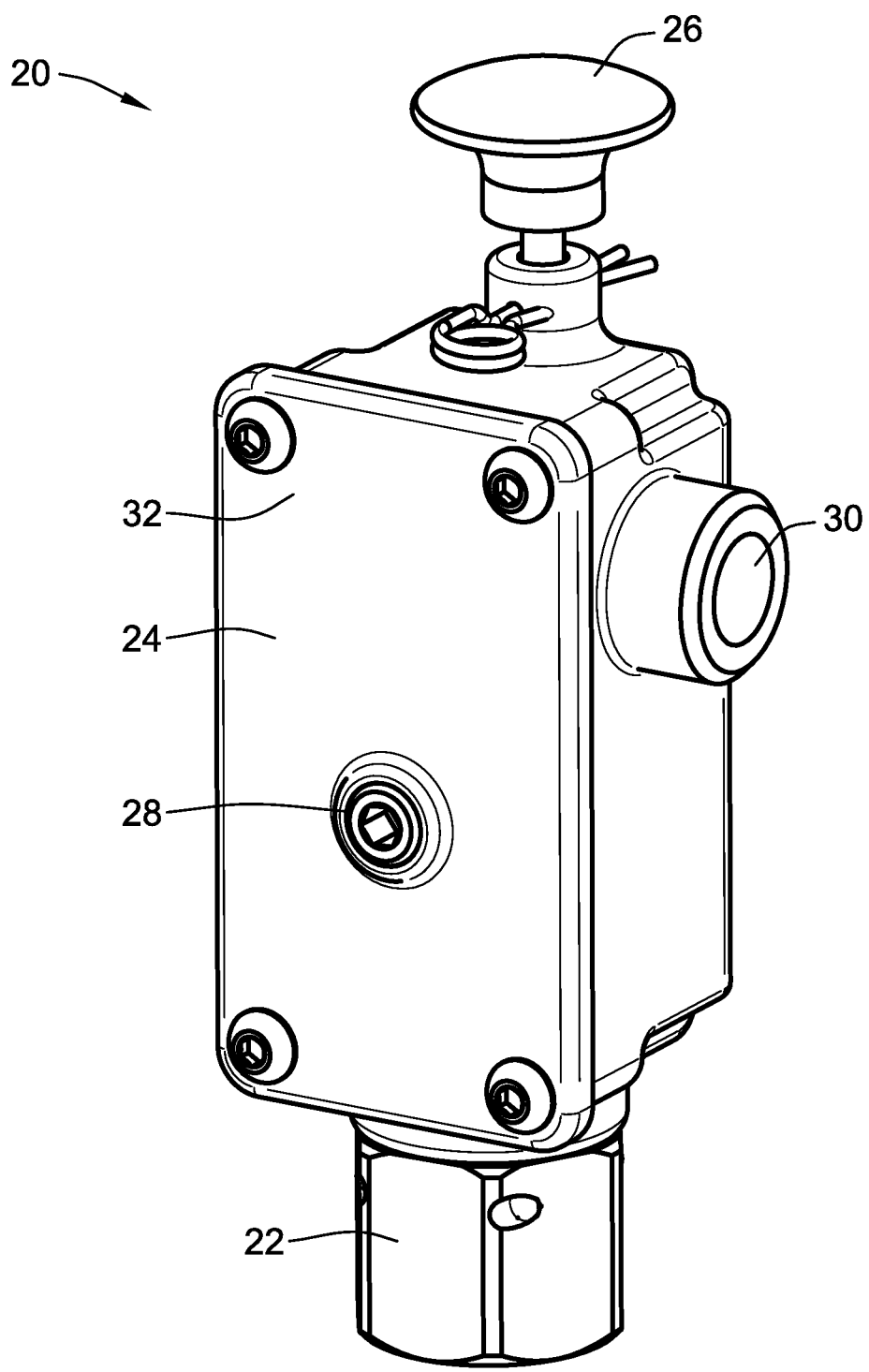
FIG. 1 is a perspective view of one exemplary embodiment of a solenoid actuator according to the teachings of the present invention.

With particular reference now to FIG. 1, solenoid actuator 20 includes a connection arrangement 22 for connecting it to a device. The device may be any device which is actuated by a linearly applied force as is typically provided by a solenoid actuator. As one non-limiting example, the device may be a valve of a fire suppression system, particularly a valve which allows or prevents flow of a fire retardant. Connection arrangement may thus be a threaded member which threads onto the valve. For other devices, connection arrangement 22 may take the form of any mechanical expedient necessary to mount solenoid actuator 20 to the device.

Solenoid actuator 20 includes a housing 24 which houses the above introduced torque transfer arrangement. A manual reset 28 is accessible from an exterior of housing 24 for manually resetting solenoid actuator from its fired position shown in FIG. 3, to its unfired position shown in FIG. 2. Also accessible from an exterior of housing 24 is a user control 26 of a manual release mechanism described below. The manual release mechanism allows a user to manually cause solenoid actuator 20 from the unfired position shown in FIG. 2 to the fired position shown in FIG. 3 in the event of a loss of power or other failure. Housing 24 also provides a conduit port 30 for routing wiring to an internally contained solenoid coil 40 (see FIG. 2), sensor devices, etc. Housing 24 includes a removable cover 32 for access to the componentry discussed below.

Figure 2:
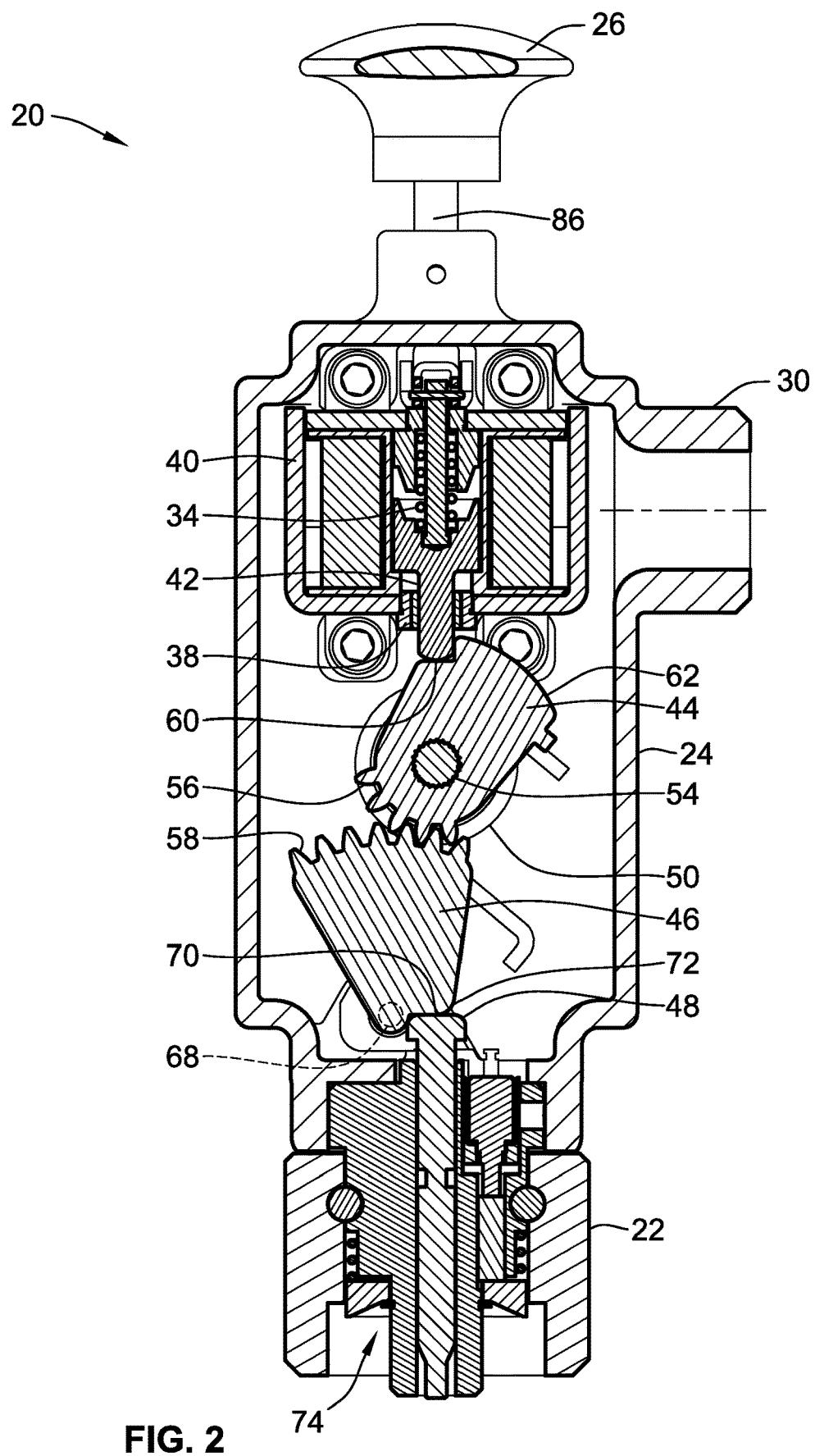
FIG. 2 is a cross section of the solenoid actuator of FIG. 1, showing a firing pin thereof in its unfired position.

FIG. 2 illustrates solenoid actuator 20 in cross section in its unfired position. Solenoid actuator 20 includes a solenoid coil 40 acting upon an armature 42. Armature is biased by a biasing element 34 into its position shown when solenoid coil 40 is not energized. However, when solenoid coil 40 is energized, the biasing force caused by this biasing element 34 will be overcome by the electromagnetic field force generated by solenoid coil 40. This causes armature 42 to move upwardly into its position shown in FIG. 3 as discussed below.

As may be seen in FIG. 2, armature 42 moves through a central passage of solenoid coil 40 having an opening. A slide bushing 38 is also positioned in this opening. Slide bushing 38 may be formed from a low-friction material and is used for the purpose of centering and aligning armature 42 during its movement. Using this low-friction material minimizes wear and force loss as armature 42 moves as discussed herein.

Still referring to FIG. 2, the above introduced torque transfer arrangement includes a first gear element 44 having a plurality of gear teeth 56 which are meshed with a plurality of gear teeth 58 of a second gear element 46 of the torque transfer arrangement. First gear element 44 is mounted about a shaft 54. At least one torsion spring 50 is mounted about this shaft to provide an input torque about shaft 54. Torsion spring 50 may act directly upon shaft 54, or directly on first gear element 44, to achieve this torque input. Indeed, in the unfired position shown in FIG. 2, torsion spring 50 is under torsion compression and provides a biasing counterclockwise (relative to the view shown in FIG. 2) torque to shaft 54. However, rotation of shaft 54 as a result of this torque is prevented due to armature 42 in its illustrated position as shown.

Figure 3:
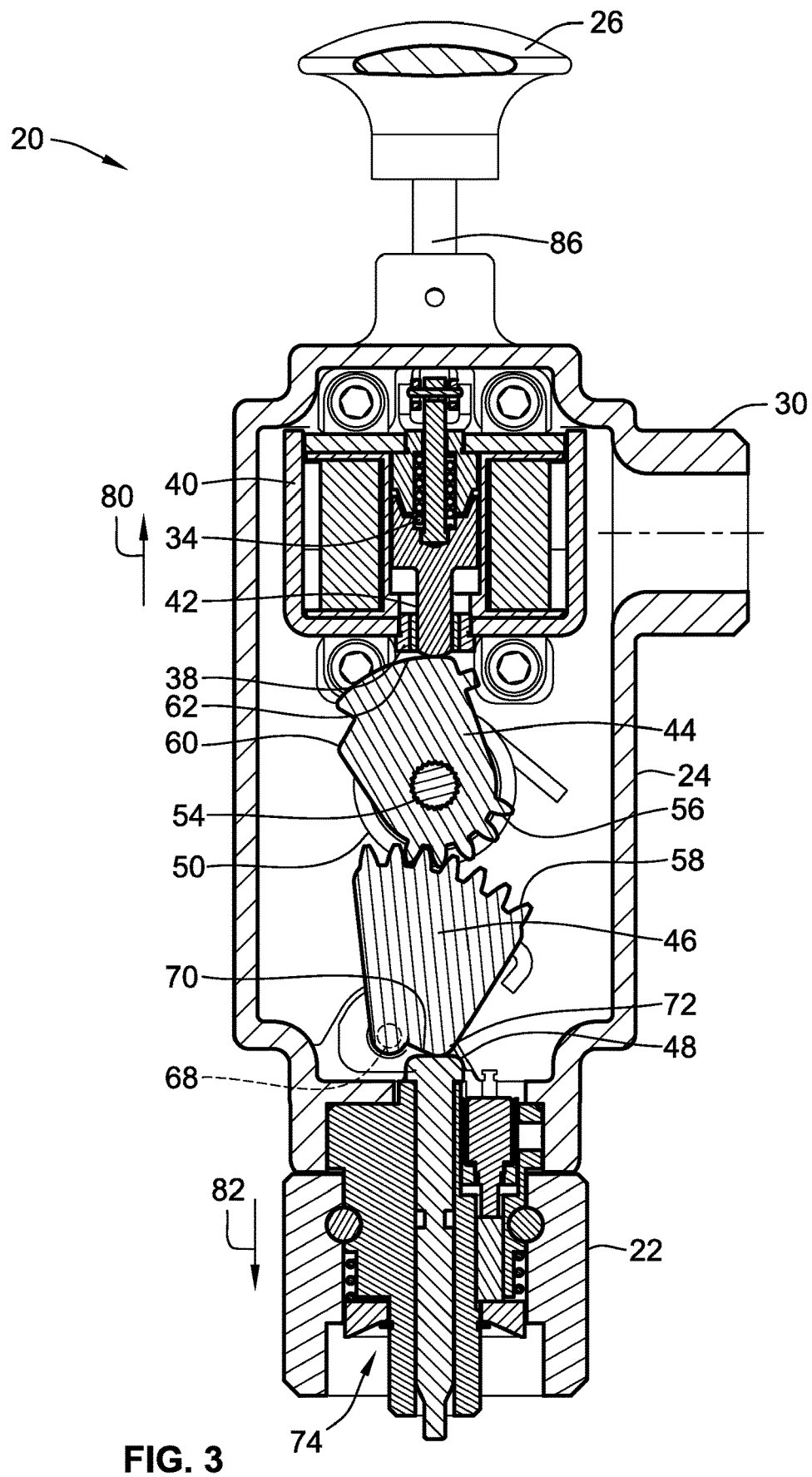
FIG. 3 is another cross section of the solenoid actuator of FIG. 1, showing the firing pin in the fired position.

Indeed, first gear element 44 includes a seat 60 against which an end of armature 42 seats as shown. This contact prevents first gear element 44, and hence shaft 54, from rotating under the biasing torque provided by torsion spring 50. As discussed below relative to FIG. 3, first gear element 44 also includes a cam surface against which the end of firing pin 42 slidably contacts when solenoid actuator 20 transitions from the unfired position shown in FIG. 2 to the fired position shown in FIG. 3. Armature 42 thus has a locked position which is shown in FIG. 2, and an unlocked position which is shown in FIG. 3.

When armature 42 is in its locked position and rotation of first gear element 44 is prevented, so too is any rotation of second gear element 46. Indeed, second gear element 46 is also mounted to a rotatable shaft 68 as shown. Any torque provided by spring 50 to rotate first gear element 44 is transferred to, and causes a like rotation in, second gear element 46 due the meshed contact between these gear elements 44, 46.

Second gear element 46 also includes a seat 70 against which an end of a firing pin 48 seats in the unfired position as shown. Similar to first gear element 44, adjacent this seat 70 is a cam surface 72 which contacts firing pin 48 as solenoid actuator 20 transitions from this unfired position shown in FIG. 2, to its fired position shown in FIG. 3. Firing pin 48 is thus said to be in its unfired position when it is in the configuration shown in FIG. 2, i.e. when it has yet to move linearly as a result of rotation of second gear element 46. Firing pin 48 is in its fired position when it is in the configuration shown in FIG. 3, i.e. when it has moved linearly as a result of the rotation of second gear element 46.

Also shown in FIG. 2 is connection detection arrangement 74 carried by connection arrangement 22. Connection detection arrangement 74 includes a sensor device for detecting whether or not solenoid actuator 20 has been fully installed onto a device. This connection detection arrangement 74 may for example take the form such a device as shown and described in any of U.S. Pat. No. 9,062,788 to Mainland et al. titled "Latching Solenoid Actuator With Container Installation Detection"; U.S. Pat. No. 9,103,461 to Dahlgren titled "Pneumatic Actuator With Container Installation Detection"; and U.S. Pat. No. 9,714,718 to Rogala et al. titled "Sensor For Connection Detection and Actuator Including Same" the teachings and disclosures of which are incorporated by reference herein in their entireties. It is noted, however, that such a connection detection arrangement 74 is entirely optional and may be omitted entirely.

FIG. 3 illustrates solenoid actuator 20 in its fired position, and hence armature 42 in its unlocked position, and firing pin 48 in its fired position. As may be seen in this view, solenoid coil 40 has energized and caused armature 42 to move upwardly in direction 80. Armature 42 has moved to such an extent so as to clear a ledge between seat 60 and cam surface 62, allowing first gear element 44 to rotate counterclockwise in FIG. 3 to the position shown. As mentioned above, this rotation is caused by the decompression of torsion spring 50.

A like rotation thus results in second gear element 46. This in turn biases cam surface 72 into contact with firing pin 48, causing the same to move in direction 82. As mentioned above, this linear movement of firing pin 48 is enough to actuate a device connected at connection arrangement 22.

The sizing of torsion spring(s) 50 and the gear ratio between first and second gear elements is such to provide a desirable force output over the stroke length of firing pin 48. In the illustrated embodiment, and for non-limiting example, a gear ratio between first gear element 44 and second gear element 46 may be 2.5:1. Other ratios are possible via a change in the sizing of these gear elements 44, 46. Further, although the torque transfer arrangement is shown and described as incorporating two gear elements 44, 46, is contemplated that greater than two gear elements could be used to achieve an overall force output of solenoid actuator 20.

Figure 4:
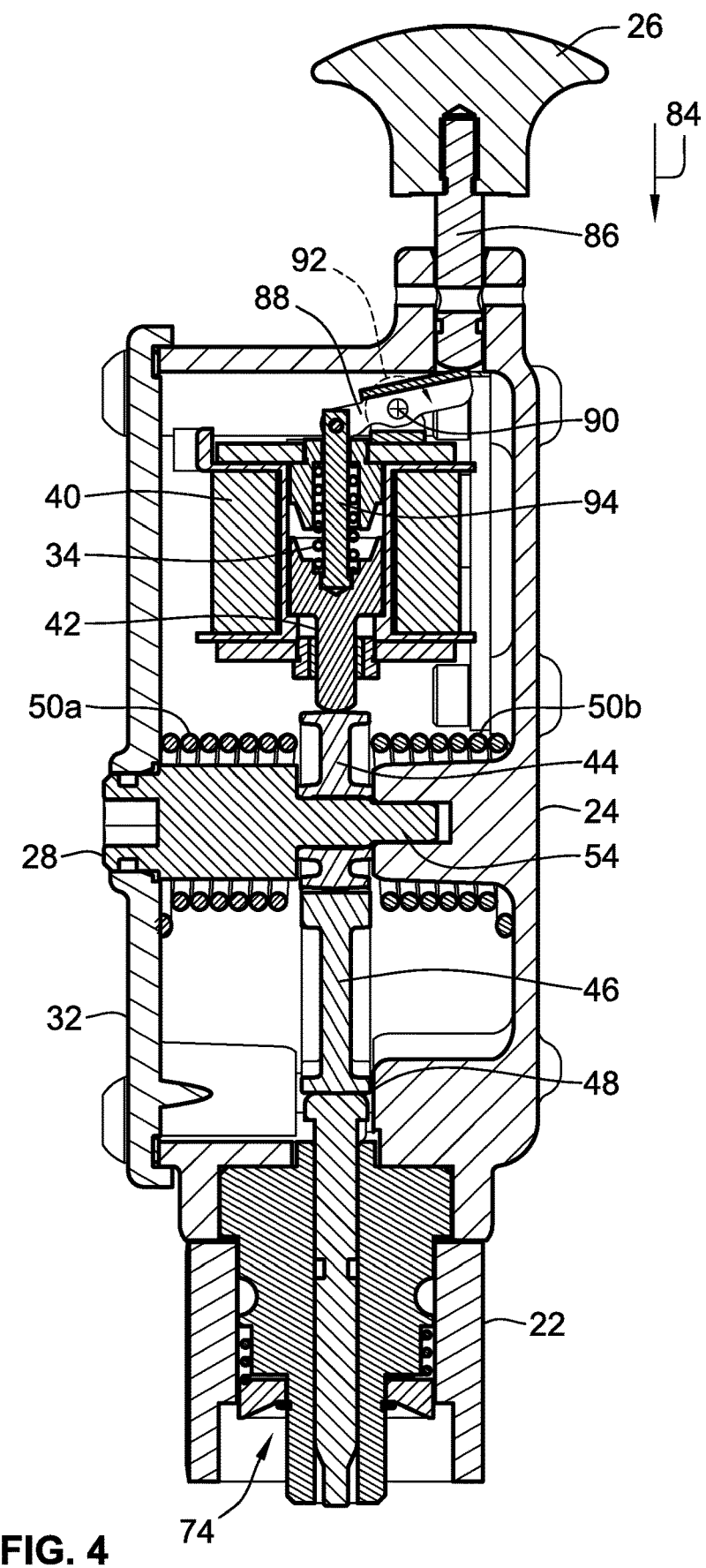
FIG. 4 is another cross section of the solenoid actuator of FIG. 1, showing a manual actuation mechanism of the solenoid actuator of FIG. 1.

Turning now to FIG. 4, the same illustrates another cross section of solenoid actuator 20, taken along the length of shaft 54. As may be seen in this configuration, torsion spring 50 includes a first and a second spring 50a, 50b, which act as described above relative to torsion spring 50. Also visible in this view are the particulars of the above introduced manual release mechanism.

This manual release mechanism includes the user control 26 introduced above connected via, or in contact with, a control rod 86 to a control arm 92. Control arm 92 is pivotable about a pivot defining a pivot axis 90 as shown. An end of control arm 92 is connected to a connection rod 94 connected to armature 42. Actuation of user control 26 in direction 84 causes a like linear movement in control rod 86. This movement by control rod 86 in turn causes control arm 92 to rotate about pivot axis 90 in direction 92. This rotation of control arm 92 pulls connection rod 94, and hence armature 42, upwards. This counter acts the force provided by the above-introduced biasing element 34 against armature 42, and manually transitions armature 42 from the locked position shown in FIG. 2, to the unlocked position shown in FIG. 3. As a result, firing pin 48 moves from the unfired position shown in FIG. 2 to the fired position shown in FIG. 3.

With the above described torque transfer arrangement, it has been found that a solenoid actuator 20 constructed in accordance with the teachings herein has a desirable force output range over a relatively minimal stroke length. As one non-limiting example, firing pin 48 may provide a force output beginning at over about 200 lbs when initially transitioning from its fired to unfired positions and ending at about 140 lbs at the end of its stroke length. This range is particularly advantages over prior designs, which typically provide a maximum output of only about 120 lbs over a stroke length of about 0.1 to about 0.2 inches. Such prior designs only provide an output of about 80 lbs at the end of their stroke length. An embodiment of solenoid actuator 20 constructed according to the teachings herein thus has the advantage of providing about a 33% increase in the force output range, and has the advantage or providing a considerably higher force output at the beginning of its stroke length.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A solenoid actuator for connection to a device, the solenoid actuator comprising:
    a housing;
    a solenoid coil carried within the housing;
    an armature acted upon by the solenoid coil, the armature linearly movable within the housing, the armature having a locked position and an unlocked position;
    a torque transfer arrangement, the torque transfer arrangement having a loaded position and an unloaded position, wherein the armature in the locked position holds the torque transfer arrangement in the loaded position, and wherein the armature in the unlocked position permits the torque transfer arrangement to transition from the loaded position to the unloaded position;
    a firing pin, the firing pin linearly movable between an unfired position and a fired position;
    wherein in the unfired position, the firing pin has a first extension distance measured between a terminal end of the firing pin and a reference axis of the torque transfer arrangement;
    wherein in the fired position, the firing pin has a second extension distance measured between the terminal end of the firing pin and the reference axis of the torque transfer arrangement, the second extension distance greater than the first extension distance; and
    wherein the torque transfer arrangement includes a first gear element, a second gear element, and at least one torsion spring acting on one of said first or second gear elements.

2. The solenoid actuator of claim 1, wherein the first and second gear elements each include gear teeth that are in meshed contact with one another such that a torque input provided by the torsion spring to one of the first or second gear elements produces a torque output at the one of the first or second gear elements.

3. The solenoid actuator of claim 2, wherein the torsion spring provides the torque input to the first gear element such that the first gear element drives the second gear element.

4. The solenoid actuator of claim 3, wherein a gear ratio between the first gear element and the second gear element is 2.5:1.

5. The solenoid actuator of claim 1, wherein each of the first and second gear elements includes a planar seat and a curved cam surface.

6. The solenoid actuator of claim 5, wherein a first end of the armature is in contact the seat of the first gear element when the armature is in the locked position, and wherein the first end of the armature is in contact with the cam surface of the first gear element when the armature is in the unlocked position.

7. The solenoid actuator of claim 6, wherein a first end of the firing pin is in contact with the seat of the second gear element when the firing pin is in the unfired position, and wherein the first end of the firing pin is in contact with the cam surface of the second gear element when the firing pin is in the fired position.

8. The solenoid actuator of claim 1, further comprising a manual release mechanism operably connected to the armature such that a user manipulated control of the manual release mechanism on an exterior of the housing is operable to transition the armature from the locked to the unlocked position upon actuation of the user manipulated control.

9. The solenoid actuator of claim 1, further comprising a slide bushing situated in an opening of the solenoid coil, the slide bushing having a central bore, wherein the armature is movable through the central bore of the slide bushing.

10. A solenoid actuator for connection to a device, the solenoid actuator comprising:
    a housing;
    a solenoid coil carried within the housing;
    an armature within the housing, the armature acted upon by the solenoid coil;
    a torque transfer arrangement configured to produce a rotational torque output upon an actuation of the armature;
    a firing pin in contact with the torque transfer arrangement such that the rotational torque output produced by the torque transfer arrangement linearly transitions the firing pin from an unfired position to a fired position, and
    wherein the torque transfer arrangement includes a first gear element, a second gear element, and at least one torsion spring acting on one of said first or second gear elements.

11. The solenoid actuator of claim 10, wherein in the unfired position, the firing pin has a first extension distance measured between a terminal end of the firing pin and a reference axis of the torque transfer arrangement, and wherein in the fired position, the firing pin has a second extension distance measured between the terminal end of the firing pin and the reference axis of the torque transfer arrangement, the second extension distance greater than the first extension distance.

12. The solenoid actuator of claim 10, wherein the first and second gear elements each include gear teeth that are in meshed contact with one another such that a torque input provided by the torsion spring to one of the first or second gear elements produces a torque output at the one of the first or second gear elements.

13. The solenoid actuator of claim 10, further comprising a manual release mechanism operably connected to the armature such that a user manipulated control of the manual release mechanism on an exterior of the housing is operable to transition the armature from the locked to the unlocked position upon actuation of the user manipulated control.

14. The solenoid actuator of claim 10, further comprising a slide bushing situated in an opening of the solenoid coil, the slide bushing having a central bore, wherein the armature is movable through the central bore of the slide bushing.

15. A solenoid actuator for connection to a device, the solenoid actuator comprising:
a housing;
a solenoid coil carried within the housing;
an armature within the housing, the armature acted upon by the solenoid coil, the armature having a locked position and an unlocked position;
a torque transfer arrangement comprising a first gear element, a second gear element, and at least one torsion spring acting on one of said first or second gear elements, the first and second gear elements in meshed contact;
a firing pin linearly movable within the housing, the firing pin having an unfired position and a fired position;
wherein in the unfired position, a first end of the firing pin is seated against a seat of the second gear element and the armature is in the locked position such that a first end of the armature is seated against a seat of the first gear element; and
wherein in the fired position, the first end of the firing pin is in contact with a cam surface of the second gear element and the armature is in the unlocked position such that the first end of the armature is in contact with a cam surface of the first gear element.

16. The solenoid actuator of claim 15, wherein a rotational torque output produced by the torque transfer arrangement linearly transitions the firing pin from an unfired position to a fired position.

17. The solenoid actuator of claim 16, wherein the first and second gear elements each include gear teeth that are in meshed contact with one another such that a torque input provided by the torsion spring to one of the first or second gear elements produces a torque output at the one of the first or second gear elements.

18. The solenoid actuator of claim 17, wherein the torsion spring provides the torque input to the first gear element such that the first gear element drives the second gear element.

* * * * *